United States Patent [19]

Music et al.

[11] Patent Number: 4,849,807

[45] Date of Patent: Jul. 18, 1989

[54] METHOD AND SYSTEM FOR COMPRESSING COLOR VIDEO FEATURE ENCODED DATA

[75] Inventors: John Music, Irvine; Gordon H. Smith, Santa Ana; James L. Thomas, Placentia, all of Calif.

[73] Assignee: Universal Video Communications Corp., Irvine, Calif.

[21] Appl. No.: 186,573

[22] Filed: Apr. 27, 1988

[51] Int. Cl.$^4$ ............................................. H04N 11/04
[52] U.S. Cl. ...................... 358/13; 358/133; 358/135
[58] Field of Search ............... 358/11, 12, 13, 133, 358/135, 136, 138, 85; 375/122

[56] References Cited

U.S. PATENT DOCUMENTS

| | | | |
|---|---|---|---|
| 3,414,677 | 12/1968 | Quinlan | 358/133 |
| 3,609,244 | 9/1971 | Mounts | 375/122 |
| 4,058,835 | 11/1977 | Kennedy | 358/134 |
| 4,060,832 | 11/1977 | Devimeux et al. | 358/133 |
| 4,179,709 | 12/1979 | Workman | 358/133 |
| 4,210,927 | 7/1980 | Yumde et al. | 358/12 |
| 4,222,076 | 9/1980 | Knowlton | 358/133 |
| 4,261,018 | 4/1981 | Knowlton | 358/133 |
| 4,302,775 | 11/1981 | Widergren et al. | 358/136 |
| 4,306,249 | 12/1981 | Croll | 358/133 |
| 4,365,273 | 12/1982 | Yamada et al. | 358/260 |
| 4,394,774 | 7/1983 | Widergren et al. | 382/56 |
| 4,420,771 | 12/1983 | Pirsch | 358/261 |
| 4,455,571 | 6/1984 | Shimizu et al. | 358/138 |
| 4,468,708 | 8/1984 | Coleman, Jr. | 358/310 |
| 4,485,400 | 11/1984 | Lemelson et al. | 358/85 |
| 4,494,144 | 1/1985 | Brown | 358/133 |
| 4,541,012 | 9/1985 | Tescher | 358/133 |
| 4,546,383 | 10/1985 | Abramatic et al. | 358/85 |
| 4,589,110 | 5/1986 | Eng et al. | 358/133 |
| 4,605,963 | 8/1986 | Reitmeier et al. | 358/133 |
| 4,633,296 | 12/1986 | Cham et al. | 358/12 |
| 4,654,484 | 3/1987 | Reiffel et al. | 379/53 |
| 4,772,956 | 9/1988 | Roche | 358/133 |
| 4,774,587 | 9/1988 | Schmitt | 358/133 |

OTHER PUBLICATIONS

Kato, Mukawa & Okubo, "A Motion Picture Coding Algorithm Using Adaptive DCT Encoding Based on Coefficient Power Distribution Classification", vol. SAC-5, No. 7, Aug., 1987.

Gerken & Schiller, "A Low Bit-Rate Image Sequence Coder Combining a Progressive DPCM on Interleaved Raster with a Hybrid DCT Technique", IEEE Journal on Selected Areas in Communications, vol. SAC-5, No. 7, Aug., 1987.

Chen & Smith, "Adaptive Coding of Monochrome and Color Images", IEEE Transactions on Communication, vol. COM-25, No. 11, Nov. 19, 1977.

Kaneko, Hatori & Koike, "Improvements of Transform Coding Algorithm for Motion-Compensated Interframe Prediction Errors-DCT/SQ Coding," IEEE Journal on Selected Areas in Communications, vol. SAC-5, No. 7, Aug. 1987.

Primary Examiner—Howard W. Britton
Attorney, Agent, or Firm—Fulwider, Patton, Lee & Utecht

[57] ABSTRACT

The method and system for compressing color video data in a video communication system utilizes a three color digital signal, and involves the determination of a luminance function for each pixel in a series of video picture frames. One or more decision parameters based upon differences of the luminance function between pixels are compared with corresponding adaptive thresholds to determine decision points in the scan lines, and the digital word size of the three digital color components is reduced before encoding of run lengths between decision points of the color values.

52 Claims, 2 Drawing Sheets

X MARKS DECISION POINTS

RED, GREEN & BLUE COLORS AT APEX

RUN LENGTH

METHOD AND SYSTEM FOR COMPRESSING COLOR VIDEO FEATURE ENCODED DATA

BACKGROUND OF THE INVENTION

1. Field of the Invention

This invention relates generally to information signal processing, and in particular to the field of processing time sequential information signals, such as video signals, for the purpose of compressing the amount of information to be transferred from an encoding site to a decoding site. A particular use of the invention is in the communication of color video data over telephone lines.

2. Prior Art

Encoding of digital television signals ordinarily requires a transmission rate of approximately 200 Mbits/s. Recent developments in coding systems have permitted the transmission rate to be cut to less than 2 Mbits/s. Coding systems using block oriented analysis of video picture frames and processing by a conventional hybrid discrete cosine transform (DCT) coefficient permit transmission at rates of between 64 Kbits/s and 384 Kbits/s. Such a system is described in Gerken and Schiller, "A Low Bit-Rate Image Sequence Coder Combining A Progressive DPCM On Interleaved Rasters With A Hybrid 25 DCT Technique", IEEE Journal on Selected Areas in Communications, Vol. SAC-5, No. 7, August, 1987. Adaptive coding techniques applied to such DCT processing have allowed video data transmission at rates as low as one to two bits per pixel, as is described in Chen and Smith, "Adaptive Coding of Monochrome and Color Images", IEEE Transactions on Communications, Vol. COM-25, No. 11, Nov. 19, 1977. However, information transmitted at such low data rates seriously affects the ability to reconstruct a sufficient number of frames per second so that a real time picture is acceptable to a viewer. High capacity telephone lines are available which will carry transmission at a rate of up to 1.544 Mbits/s, but such lines are extremely expensive at a dedicated use rate, and are still quite expensive at a scheduled use rate. Lower capacity telephone lines are available which permit transmission at rates of up to 56 Kbits/s and 64 Kbits/s. Relatively expensive video digital and coding devices are commercially available which will transmit a video signal at 56,000 bits per second, so that it is necessary to utilize a combination of a device of this nature with the high capacity 1.544 Mbits/s telephone line to allow a framing speed much faster than about one frame per second. The current transmission rate limit of ordinary telephone lines approaches 18,000 bits per second, so that transmission of real time sequencing of video pictures over ordinary telephone lines has been viewed in the prior art as not being feasible.

Various schemes for reducing the amount of redundancy of information to be transmitted in a digital video signal have been used. One technique is to utilize a slow scan camera; and another technique is to transmit every nth scanning line for each frame. Another technique involves the sending of only those parts of a picture frame which are deemed to be important or to have changed in some significant manner, by dividing the picture frame into a number of segments or blocks which are typically 3×3 or 4×4 groups of pixels, and analyzing the content of the blocks. These techniques tend to also reduce the resolution of the video picture.

Another technique in the reduction of transmission time which does not decrease the resolution of a picture transmitted is run length encoding. In run length encoding, the scan lines of a picture frame are encoded as a value of the color content of a series of pixels and the length of the sequence of pixels having that value or range of values. The values may be a measure of the amplitude of a video signal, or other properties of such video signals, such as luminance or chrominance. An example of a system which utilizes run length coding of amplitude of video signals is U.S. Pat. No. 3,609,244 (Mounts). In that system, a frame memory also determined frame to frame differences, so that only those differences from one frame to the next are to be transmitted. Another example of a method for transmitting video signals as compressed run length values which also utilizes statistical coding of frequent values to reduce the number of bits required to represent data is U.S. Pat. No. 4,420,771 (Pirsch).

Ideally, compression of color video information to allow real time sequencing of picture frames at a rate of up to 15 frames per second, and at bit rates as low as 11,500 bits per second would be desirable, to allow the communication of color video data over ordinary telephone lines. A video data compression system able to achieve equivalent data transmission rates as systems using higher quality telephone lines with more efficient and less costly equipment than is currently available would also be desirable.

SUMMARY OF THE INVENTION

The present invention provides for a method and system for compressing color video data in a video communication system, in which a luminance function is utilized to determine differences between the luminance of pixels in the scan lines of the picture, to determine the absolute of change about certain decision points in each scan line, and in which the digital word size of the color values is reduced. Thereafter pixels in the scan lines of the picture are coded as a series of run lengths of the digitally compressed color values.

Briefly, and in general terms, the method for compressing color video data according to the present invention is for use in a video communication system having means for producing a color video signal comprising three digital color component signals of first, second and third digital word sizes, and includes determining a luminance function for each pixel based upon the digital color signals; determining at least one decision parameter based upon differences in a said luminance function between pixels a given distance from one another; comparing the absolute values of change of at least one decision parameter with threshold values to determine decision points; reducing the word size of digital color signals to provide reduced digital color signals of fourth, fifth and sixth digital word sizes; and coding the pixels in scan lines as combinations of run lengths and the digitally reduced color signals The invention also provides generally for a system for compressing color video data for use in a video communications system having means for producing a color video signal comprising three digital color signals of first, second and third digital word sizes, and having means for determining a luminance function for each pixel based upon the digital color signals; the data compression system comprising means for determining at least one decision parameter based upon differences in said luminance function between pixels a given distance from one another; means for comparing the absolute values of change of the decision parameters with one or more corresponding threshold values to determine decision points; means for reducing the word size of the digital color signals to give reduced digital color signals of fourth, fifth, and sixth digital word sizes; and means for coding the pixels in scan lines as combinations of run lengths of the digitally reduced color signals. The invention also provides for a camera which includes the data compression system.

In a preferred embodiment, the digital color component signals are RGB, and the color component word sizes are equal. The digital word size of the digital color components is preferably initially six bits per each component color, and the luminance function is determined with an accuracy based upon the six bit digital color values. Thereafter the word size of the digital color components is reduced to four bits each, and the run length and color components are coded together as a bit stream of combined run length and color information in sixteen bit digital words.

Other aspects and advantages of the invention will become apparent from the following detailed description and the accompanying drawings illustrating by way of example the features of the invention.

DETAILED DESCRIPTION OF THE INVENTION

Figure 1:
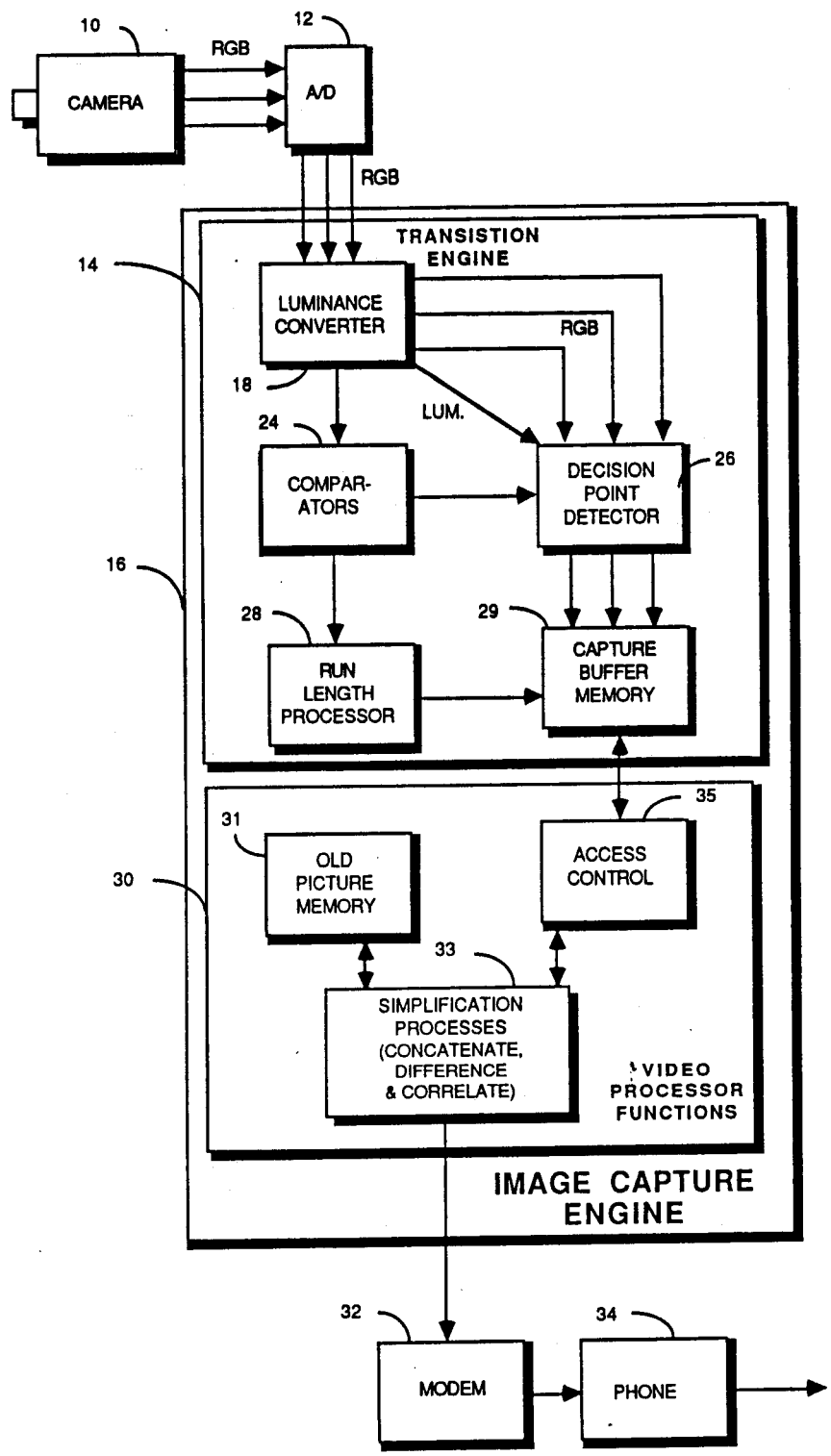
FIG. 1 is a schematic diagram of the system and method for compressing color video data in a video communication system.

As is shown in the drawings for purposes of illustration, the invention is embodied in a method and system for compressing color video data in a video communication system having means for producing a color video signal for a plurality of picture frames, with each picture frame comprising a plurality of scan lines composed of a plurality of pixels, each scan line having a starting pixel and an ending pixel, and each pixel in each frame comprising three digital color component signals of first, second and third digital word sizes. For each pixel a luminance function is determined, based upon at least one of the three digital color component signals for at least a substantial portion of the pixels in the scan lines of the picture frame, and one or more decision parameters based upon the difference of the luminance function between pixels at least one predetermined distance from another pixel on the scan line is determined for at least a substantial portion of the pixels in the scan lines of the picture frame. The absolute value of change of at least one of the decision parameters for each of the pixels is determined, and the amounts of change are compared with a corresponding threshold value to determine which of the pixels in the scan lines are loci for significant decision points in the decision parameter from pixel to pixel.

The word size of at least one of the three digital color component signals is reduced to provide three digitally reduced digital color component signals of fourth, fifth, and sixth digital word sizes, respectively, for each pixel, and these reduced digital color component signals are coded for each scan line as a plurality of combinations of pixel run lengths and the reduced color component signals for each run length, with the run lengths being determined between a starting point for each scan line, intermediate points which are decision points or points intermediate the decision points, and an ending pixel, with each run length being of a seventh digital word size.

The coding of the digital color components reduced in their overall digital word size reduces the amount of information which is to be transmitted, without any significantly perceptible reduction in the color information received. The implementation of the invention permits the compression of color video data to levels which permit real time telecommunication and other applications of color video data compression without significant losses of perceptible information.

In accordance with the present invention, there is thus provided a method for compressing color video data in a video communication system having means for producing a color video signal for a plurality of video picture frames, with each picture frame comprising a plurality of scan lines composed of a plurality of pixels, each scan line having a starting pixel and an ending pixel, and each pixel in said picture frame comprising three digital color component signals of first, second and third digital word sizes, respectively, said method comprising the steps of determining a luminance function for each pixel based upon at least one of said three digital color component signals; determining at least one decision parameter for at least a substantial portion of the pixels in the scan lines of said picture frame based upon the difference of said at least one luminance function between pixels at least one predetermined distance from at least one other pixel on each scan line; comparing the absolute values of said differences with at least one adaptive absolute difference threshold to determine which of said pixels represent decision points; reducing the word size of at least one of said three reduced digital color components signals to provide three digital color component signals of fourth, fifth, and sixth digital word sizes, respectively, for each said pixel; coding said plurality of pixels in each scan line as a plurality of combinations of pixel run lengths and said three reduced color component signals for each said run length, said run lengths being determined between said starting pixel for each scan line, intermediate points selected from the group of said decision points and points intermediate said decision points, and said ending pixel, and each run length being of a seventh digital word size.

The present invention further provides for a system for compressing color video data in a video communication system having a camera for producing a color video signal for a plurality of video picture frames, with each picture frame comprising a plurality of scan lines composed of a plurality of pixels, each scan line having a starting pixel and an ending pixel and each pixel in said frame comprising three digital color component signals of first, second and third digital word sizes, respectively, said system comprising means for determining a luminance function for each pixel based upon at least one of said three digital color component signals; means for determining at least one decision parameter for at least a substantial portion of the pixels in the scan lines of said picture frame based upon the difference of said luminance function between pixels at least one predetermined distance from at least one other pixel on each scan line; means for comparing the absolute values of said differences with at least one adaptive absolute difference threshold to determine which of said pixels represent decision points; means for reducing the word size of at least one of said three reduced digital color components signals to provide three digital color component signals of fourth, fifth, and sixth digital word sizes, respectively, for each said pixel; means for coding said plurality of pixels in each scan line as a plurality of combinations of pixels run lengths and said three respective reduced color component signals for each said run length, said run lengths being determined between said starting pixel for each scan line, intermediate points selected from the group of said decision points and points intermediate said decision points, and said ending pixel, and each run length being of a seventh digital word size. The present invention additionally provides a camera which includes the data compression system, for use in a video communication system.

As is illustrated in the drawings, in a preferred implementation of the invention, the video communication system is capable of producing a color video picture using an RGB video camera, generating an analog RGB signal at the normal 60 fields per second, with each field representing half of the picture in an interlaced mode. The signal for the video picture frames generated by the camera 10 is received by an analog to digital converter 12, which converts the red, green and blue (RGB) analog components into digital RGB components, which are each digitized as six bit digital words, forming packets of bits for the RGB components for each pixel of the color video picture of eighteen bits.

The type of the device used to generate the source color video picture is not crucial to the invention, as a camera generating a standard NTSC composite signal which is converted to an RGB digital output would also be suitable as would a field rate differing from the standard 60 fields per second. The output of the camera also does not need to be strictly RGB, since other three color component groups may be used to create and transmit color video pictures. For example, the three digital color component signals may be cyan, magenta, and yellow; hue, saturation, and intensity; or even two distinct colors and a third parameter based upon the entire video signal, such as hue, saturation or intensity of an original analog video signal, so that there would be some automatic weighting of the color information generated by the camera.

It is also not essential that the three color components be represented by the same number of bits, since it is known in the television industry that certain ranges of colors are not as easily perceived by the human eye. Such a weighting of information could involve a reduction in the number of bits used for the red component in an RGB scheme, for example, thus permitting transmission of more gradations of other color information that is actually perceptible.

In addition, the source of the color video pictures to be compressed may be a storage means, such as a video disk, a computer file storage media, a video tape, or the like from which the color video information can be processed for introduction into the color video data compression system of the invention.

The digitized RGB signal is received by the transition engine portion 14 of the image capture engine 16, which preferably includes integrated circuit means and associated memory means. The first major part of the image capture engine is the transition engine which includes circuitry for determining a luminance function based upon the three color component video signal for each picture element, or pixel, of each scan line in the sequence of video picture frames generated by the analog front end of the system. In the preferred mode, the luminance converter 18 sums the bits from each of the three digital color components for each pixel in the scan lines of the video picture frame to get a luminance (or intensity) value and performs further processing of the data obtained. In the system of the present invention each scan line preferably contains 480 pixels, which matches the resolution of the camera and which provides for better resolution than is typically available in the prior art, in which generally only 256 pixels are utilized per scan line. The luminance of the three color components may be weighted to give greater significance to one color or two colors to provide the luminance function, and may also be based in part upon an original source analog video signal. However, the luminance function is preferably based in part at least upon the sum of the three digital color components. The luminance function derived from the sum of the three six bit color components therefore has a digital word size of eight bits. This luminance function for each pixel is utilized in the input capture engine for evaluating one or more decision parameters based upon the luminance function for determination of those pixels which operate as decision points about which the one or more of the decision parameters are found to vary from a prestored set of threshold values.

The luminance function is an excellent indicator of color changes in the picture, or movements of objects in the picture. In the image capture engine the one or more decision parameters based upon the luminance function may also be used as the basis for determination of differences from line to line, and of distinctive sequences of pixels which define edges of objects which can be determined to be moving from frame to frame. Generally, the luminance, or other combination of color components which comprise the luminance function, undergoes significant changes where there are changes in the characteristics of the picture.

The camera also introduces anomalies or artifacts into the video picture due to noise in the color sampling resolution which ideally should be eliminated to reduce the amount of data to be transmitted since they contribute nothing beneficial to the picture. When the picture is displayed with a new field every 60th of a second, the effect of such anomalies is averaged out by the human eye. Areas having a smooth appearance and little actual detail upon close observation seem to "crawl". This appearance is also known as the "mosquito effect". When a picture is frozen so that only one field or picture frame is being examined, the picture takes on a grainy, speckled appearance. The impact of the noise on the luminance data is in the form of tiny variations in the computed luminance. When the picture is digitized, the digitizing process also converts all of these artifacts to digital representations, even though they do not actually represent picture detail. The processing of luminance in the image capture engine operates to eliminate such meaningless details One preferred method eliminating the non-essential details caused by noise in the luminance data is to determine the points of change based at least in part on the luminance function for pixels in the scan lines by comparing differences in one or more decision parameters with corresponding adaptive thresholds. This is termed feature encoding. The decision parameters are preferably comprised of differences of the luminance function between pixels, determined between proximate pixels (Diff-1) in a scan line, n plus one n plus two, or even a further distance away, where n represents the position on a scan line of the pixel being examined for changes in luminance; between adjacent first differences (Diff-2), and a cumulative parameter (Cum-diff) which is a sum of the individual difference functions Diff-1, and Diff-2. Each decision parameter has its own corresponding adaptive threshold, having a default value which is subject to modification by the system in response to operator settings. The adaptive threshold preferably has a default value which may be adjusted by the input capture engine responsive to operator or processor selections for resolution. The selecting of the threshold parameters for determining either the feature or transition decision points is quite subjective. The selection of the parameters determines the number of data points required to define the picture and it also determines the overall perceptual quality of the picture.

Typically for the feature run length determination, two thresholds are used. One is the cumulative change in luminance since the last decision point, Cumdiff. Cumdiff will trigger a decision point if it was greater than 6 and the number of pixels since the last decision point was greater than 5. Another decision parameter is the sum of two adjacent difference values, Diff2 (this is the same as the difference between luminance values that are two pixels apart). If the Diff2 value is computed to be greater than typically 32, the logic wil signify that the line is entering an edge, which identifies a decision point, and will stay in the edge characteristic until the Diff2 value falls below 20. When the edge mode is exited, the color of the next pixel is carried all the way back to the pixel where the starting edge determination was made. Also, if Diff2 changes sign, it signifies a new decision point. Changing the values for the cumdiff thresholds greatly affects the quality and data complexity of the picture.

In the slope determination of decision points apexes), three general conditions are used. An initial slope is determined at the decision point and all measurements are base on that slope. The initial slope, INITS, is determined by computing the following function termed NDIFF2:

$$NDIFF2 = (luminance_{(i+2)} - luminance_{(i)})/2$$

INITS is the value of NDIFF2 immediately after the decision point.

CUMDIFF in the slope case is defined the following way:

$$CUMDIFF_{(i)} = CUMDIFF_{(i-1)} + NDIFF2_{(i)}$$

If the absolute value of the CUMDIFF is typically greater than 20 and the number of pixels in the run length is typically greater than 10, then a decision point will be triggered. Similarly, if the absolute value of NDIFF2 is less than or equal to typically 4 and the run length is typically greater than 5, a decision point will be triggered unless the last decision point was also triggered in this manner. The third decision parameter is also based upon NDIFF2:

$$TRIGVAL_{(i)} = NDIFF2_{(i)} - INITS$$

Figure 2:
FIG. 2 is a luminance plot across one scan line in a video picture.
Figure 2:
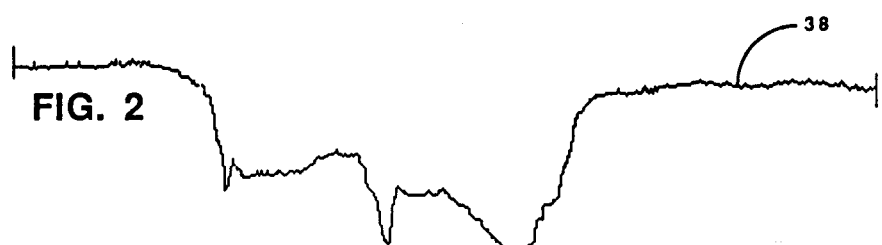
Figure 3:
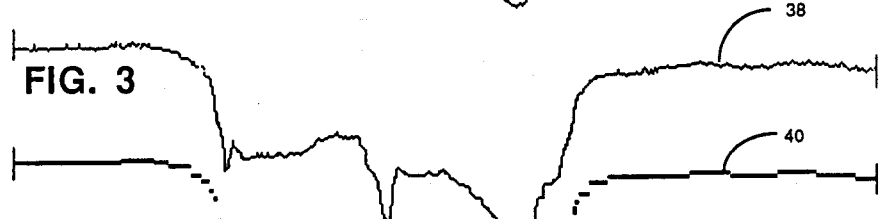
FIG. 3 shows a run length representation of features in a video scan line.

The threshold for TRIGVAL is usually set in the range of 4 to 10 and will trigger a decision point any time the absolute value reaches or exceeds the set value and the run length is at least 2 pixels. Other techniques may be used but these seem to give good quality pictures with an acceptable number of data points A graphic representation of a typical plot of luminance across a line of a video picture is shown in FIG. 2. The luminance function of the pixels intersected by the scan line 36 is graphically represented by line 38. As is shown in FIG. 3, a graph of the decision points based upon comparison of one of the decision parameters with the corresponding adaptive difference threshold in a feature encoding technique, results in stepped line 40, a sequence of horizontal straight lines across the luminance pattern. Each horizontal line represents a separate length of a specific color.

Figure 4:
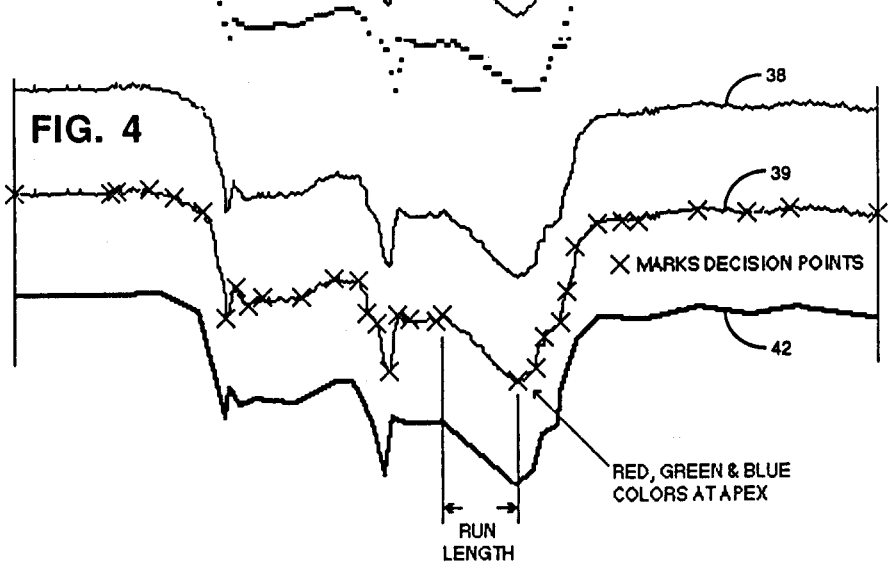
FIG. 4 shows a run length representation of transitions about slope decision points of a video scan line.

A second approach which may be used to eliminate the non-essential details is a transition or slope encoding technique, which is illustrated in FIG. 4. In this technique the rate of change of the differences in the decision parameter between pixels is determined, and the rates of change of these differences are compared with an adaptive, prestored difference rate of change threshold to determine decision points or apex points. These change points or decision points are indicated as X's on line 39. They indicate the location of the next apex. "Run length" is defined as being the pixel distance between decision points, for both the feature encoding and slope encoding techniques. According to the transition or slope encoding technique, the luminance data results in a line 42 representing a series of apexes or slope decision points, which may be used for controlling the color segments between decision points. A drawing engine can produce a smooth transition of color values for the run length between decision points when the encoded information is to be retrieved. In this technique, for each scan line an initial color is transmitted, followed by as many sequences of run length and color values as are necessary to represent the picture frame content.

In the image capture engine of FIG. 1, the decision point detector 26 for determining decision points may alternatively be able to utilize either one of these methods for fixing the decision points in the color of the pixels in the picture, as each method has its respective advantages and disadvantages. The feature coding technique is typically more appropriate for pictures with a complexity of objects with distinctive edges or lines. On the other hand, the slope encoding technique is most suitable for encoding gradual transitions in shading or gradual color changes, but may require additional coding to represent complex pictures with images having many edges and lines. In the preferred implementation of the slope encoding technique, a sequence of thresholds will be compared with decision parameters, and the cumulative parameter (cum-diff) and an adaptive cumulative threshold will also be utilized in determining decision points, to account for those slow, gradual rates of change of luminance which would still result in an accumulated luminance change which is significant enough to merit identification of a decision point.

The three component color codes are also operated on in the run length processor 28 to drop the two least significant bits from the six bit values for the color components, reducing each of the color components in the preferred mode to four bit digital words. Alternatively, in one preferred embodiment, the transition engine may also contain a predetermined color map representation of three-component colors, with an n-bit code corresponding to a particular color combination. Here, the colors of the image are matched as closely as possible with the colors in the color map. As a further alternative, the color codes could also be rounded. These truncated or reduced digital color components are then encoded with the run lengths between decision points in the run length processor 28. Although the preferred bit size for the reduced color components is four bits, just as the input digital word size for the color components from the analog front end can be of different sizes to vary the informational content, the reduced digital color components may also be of different sizes. A particular combination of digital word sizes for color components may include a reduced size for the red component, due to the recognition in the industry of the reduced perceptibility of this component.

This feature encoding technique allows for a variable number of bits to be used to represent an initial picture frame and then changes in subsequent picture frames, in order to encode the minimum number of bits for each picture frame. This is significant a improvement over the prior art which typically analyzes a four by four or three by three block of pixels to compress the information in such a block, which always results in the same number of bits being utilized to represent the informational content in the picture, whether there have been changes outside the segment or not.

The second major portion of the image capture engine is the capture buffer memory (CBM) 29, which receives the encoded run lengths and reduced color components representing some 200 lines of data from the picture frame. Alternatively, if the data rate required becomes too high to send pictures at a desired speed, lesser numbers of scan lines can be stored, such as 150 or 100 lines. The run length and color component information in the capture buffer memory is then transmitted to the video data processor 30, which accesses the run length and color data in the capture buffer memory by an access control 35, and operates as an interface to transform and transmit the video information in a format suitable for transmission by the modem 32, connected to the telephone 34, and which may include means for further compressing the video data, at 33. The video data may also be compared with a previous picture frame stored in an old picture memory 31.

It is possible in a simplification processor 33 of the video data processor 30 to further analyze the difference between color values of pixels after the color codes have been truncated to provide the reduced color component codes, and to concatenate run lengths of such reduced color component codes which vary less than a given threshold value, or to further concatenate run lengths of the reduced color codes based upon variance of one or more of the decision parameters with respect to a corresponding threshold As the run length code is typically at a maximum of four bits to be compatible with run length and color code combinations of 16 bits, with 16 bit computer buses in the current implementation, concatentation of a sequence of pixels for each run length would be expected to permit coding of up to sixteen pixels per run length. However, in the current implementation the values 0 to 15 are used to represent run lengths of from 2 to 17 pixels, since run lengths of 0 and 1 are not meaningful. Alternatively, longer run lengths may be determined initially as well, as may be compatible with different capacity computer buses, to permit run lengths of greater than 4 bits and run length color code combinations greater than 16 bits.

As mentioned previously, it is expected that the limits of compression required for adequate smoothing of information in a real time sequencing of video pictures in telecommunication would be about 15 frames per second for transmission over conventional telephone lines. It would be possible to use a modem at 1200 bps (bits per second), but this would considerably slow the number of frames per second possible in the communication system. Ideally, the system is configured for half duplex mode, and a full duplex mode of configuration would be expected to require two telephone lines. Ideally the modem that is to be used is one which would utilize the largest bandwidth possible, and may be conventional 2400 bps or 9600 bps modem or special modems providing higher bit rates may be used.

Although the invention has been described in the context of a video telephone conferencing system, the invention may be also be adapted for use in compressing color video data on magnetic media, such as magnetic floppy discs which may be used in storing and communicating such data via computer systems, magnetic hard disks for image storage or short video movie sequences, or on video discs for video disc players which could transmit the information in the form of a full length movie.

In the foregoing description, it has been demonstrated that the method and system for compressing color video data can achieve a significant elimination of extraneous noise introduced by a video camera, and can result in a significant improvement in coding of the minimum amount of information necessary to reconstruct color video picture frames in a real time sequencing of video pictures.

It will also be appreciated that the method and system for compressing color video data in a video communication system according to the invention reduces the digital word sizes of data encoded, and codes only the minimum necessary decision points in scan lines in video color pictures for reception, storage, and/or retrieval by a system for decompressing and decoding the color video information.

Although one specific embodiment of the invention has been described and illustrated, it is clear that it is susceptible to numerous modifications and embodiments within the ability of those skilled in the art and without the exercise of the inventive facility. Thus, it should be understood that various changes in form, detail and application of the present invention may be made without departing from the spirit and scope of this invention.

I claim:

1. A method for compressing color video data in a video communication system having means for producing a color video signal for a plurality of video picture frames, with each picture frame comprising a plurality of scan lines composed of a plurality of pixels, each scan line having a starting pixel and an ending pixel, and each pixel in said picture frame comprising three digital color component signals of first, second and third digital word sizes, respectively, said method comprising the steps of:

(a) determining a luminance function for each pixel based upon at least one of said three digital color component signals;

(b) determining at least one decision parameter for at least a substantial portion of the pixels in the scan lines of said picture frame based upon the difference of said luminance function between pixels at least one predetermined distance from at least one other pixel on each scan line;

(c) comparing the absolute value of said at least one decision parameter with at least one adaptive absolute difference threshold to determine which of said pixels represent decision points;

(d) reducing the word size of at least one of said three reduced digital color components signals to provide one to three digital color component signals of fourth, fifth, and sixth digital word sizes, respectively, for each said pixel;

(e) coding said plurality of pixels in each scan lines as a plurality of combinations of pixel run lengths and said three respective reduced color component signals for each said run length, said run lengths being determined between said starting pixel for each scan line, intermediate points selected from the group of said decision points and points intermediate said decision points, and said ending pixel, and each run length being of a seventh digital word size.

2. The method of claim 1, wherein said first, second, and third digital word sizes are equal.

3. The method of claim 1, wherein at least two of said first, second, and third digital word sizes are equal.

4. The method of claim 1, wherein each of said first, second, and third digital word sizes are different.

5. The method of claim 1, wherein said color video signal is RGB, and said three digital color component signals represent red, green, and blue color video components.

6. The method of claim 1, wherein said three digital color component signals represent cyan, magenta, and yellow color video components.

7. The method of claim 1, wherein said three digital color component signals represent first and second colors and a parameter based upon luminance of the color video signal.

8. The method of claim 1, wherein said three ditigal color components are based upon hue, saturation, and intensity of said color video signal.

9. The method of claim 1, wherein each said combination of run length and reduced color components is coded as at least 16 bit digital word.

10. The method of claim 1, further including the step of concatenating run lengths in said plurality of combinations of run lengths and reduced color components in a scan line which are associate with reduced color components whose differences are less than a predetermined color difference threshold.

11. The method of claim 1, wherein a first decision parameter is determined from the difference in said luminance function between a first pixel and a second proximate pixel a distance of one pixel away from said first pixel on a scan line.

12. The method of claim 11, wherein a cumulative decision parameter is determined from summing said proximate pixel differences.

13. The method of claim 1, wherein a first decision parameter is determined from the difference in said luminance function between a first pixel and a second pixel a distance of two pixels away from said first pixel a scan line.

14. The method of claim 13, wherein a cumulative decision parameter is determined from summing said proximate pixel differences.

15. The method of claim 1, wherein the digital word size of each of said digital color components is six bits.

16. The method of claim 15 wherein the word size of each of said reduced digital color components is reduced to 4 bits.

17. The method of claim 16, wherein each said combination of run length and reduced color components is coded as at least a 16 bit digital word.

18. The method of claim 1, wherein the step of determining said luminance function comprises summing each of said three digital color component signals.

19. The method of claim 18, wherein said luminance function has digital word size of 8 bits.

20. The method of claim 18, wherein the step of determining said luminance function includes weighting of the sum of said three digital color component signals with respect to one or more of said three digital color component signals.

21. A system for compressing color video data in a video communication system having a camera for producing a color video signal for a plurality of video picture frames, with each picture frame comprising a plurality of scan lines composed of a plurality of pixels, each scan line having a starting pixel and an ending pixel and each pixel in said frame comprising three digital color component signals of first, second and third digital word sizes, respectively, said system comprising:

(a) means for determining a luminance function for each pixel based upon at least one of said three digital color component signals;

(b) means for determining at least one decision parameter for at least a substantial portion of the pixels in the scan lines of said picture frame based upon the difference of said at least one luminance function between pixels at least one predetermined distance from at least one other pixel on each scan line;

(c) means for comparing the absolute values of said at least one decision parameter with at least one adaptive absolute difference threshold to determine which of said pixels represent decision points;

(d) means for reducing the word size of at least one of said three reduced digital color components signals to provide one to three digital color component signals of fourth, fifth, and sixth digital word sizes, respectively, for each said pixel;

(e) means for coding said plurality of pixels in each scan line as a plurality of combinations of pixels run lengths and said three respective reduced color component signals for each said run length, said run lengths being determined between said starting pixel for each scan line, intermediate points selected from the group of said decision points and points intermediate said decision points, and said ending pixel, and each run length being of a seventh digital word size.

22. The system of claim 21, wherein said first, second, and third digital word sizes are equal.

23. The system of claim 21, wherein at least two of said first, second, and third digital word sizes are equal.

24. The system of claim 21, wherein each of said first, second, and third digital word sizes are different 25. The system of claim 21, wherein said color video signal is RGB, and said three digital color component signals represent red, green, and blue color video components.

26. The system of claim 21, wherein said three digital color component signals represent cyan, magenta, and yellow color video components.

27. The system of claim 21, wherein said three digital color component signals represent first and second colors and a parameter based upon luminance of the color video signal 28. The system of claim 21, wherein said three digital color components are based upon hue, saturation, and intensity.

29. The system of claim 21, wherein said means for encoding said plurality of pixels in each scan line is adapted to encode each said combination of run length and reduced color components as at least a 16 bit digital word.

30. The system of claim 21, further including means for concatenating run lengths in said plurality of combinations of run lengths and reduced color components in a scan line which are associated with reduced color components whose differences are less than a predetermined color difference threshold.

31. The system of claim 21, wherein the digital word size of each of said digital color components is six bits.

32. The system of claim 31, wherein said means for reducing said word size of each of said digital color components is adapted to reduce the word size of each of said digital color components to 4 bits.

33. The system of claim 32, wherein said means for encoding said plurality of pixels in each scan line is adapted to encode each said combination of run length and reduced color components as at least a 16 bit digital word.

34. The system of claim 21, wherein said means for determining said luminance function comprises means for summing each of said three digital color component signals 35. The system of claim 34, wherein said luminance function has a digital word size of 8 bits.

36. The system of claim 34, wherein said means for determining said luminance function includes weighting of the sum of said three digital color component signals with respect to one or more of said three digital color component signals.

37. In a camera for use in a video communication system, said camera being of the type producing a color video signal for a plurality of video picture frames, with each picture frame comprising a plurality of scan lines composed of a plurality of pixels, each scan line having a starting pixel and an ending pixel, said camera producing for each pixel in said frame three digital color component signals of first, second and third digital word sizes, respectively, the improvement in said camera comprising:
(a) means for determining a luminance function for each pixel based upon at least one of said three digital color component signals;
(b) means for determining at least one decision parameter for at least a substantial portion of the pixels in the scan lines of said picture frame based upon the difference of said luminance function between pixels at least one predetermined distance from at least one other pixel on each scan line;
(c) means for comparing the absolute values of said at least one decision parameter with at least one absolute difference threshold to determine which of said pixels represent decision points;
(d) means for reducing the word size of at least one of said three reduced digital color components signals to provide one to three digital color component signals of fourth, fifth, and sixth digital word sizes, respectively, for each said pixel;
(e) means for coding said plurality of pixels in each scan line as a plurality of combinations of pixel run lengths and said three respective reduced color component signals for each said run length, said run lengths being determined and between said starting pixel for each scan line, intermediate points selected from the group of said decision points and points intermediate said decision points, and said ending pixel, each run length being of a seventh digital word size.

38. The camera of claim 37, wherein said first, second, and third digital word sizes are equal.

39. The camera of claim 37, wherein at least two of said first, second, and third digital word sizes are equal.

40. The camera of claim 37, wherein each of said first, second, and third ditigal word sizes are different.

41. The camera of claim 37, wherein said color video signal is RGB, and said three digital color component signals represent red, green, and blue color video components.

42. The camera of claim 37, wherein said three digital color component signals represent cyan, magenta, and yellow color video components.

43. The camera of claim 37, wherein said three digital color component signals represent first and second colors and a parameter based upon luminance of the color video signal.

44. The camera of claim 37, wherein said three digital color components are based upon hue, saturation, and intensity of said color video signal.

45. The camera of claim 37, wherein said means for encoding said plurality of pixels in each scan line is adapted to encode each said combination of run length and reduced color components as at least a 16 bit digital word.

46. The camera of claim 37, further including means for concatenating run lengths in said plurality of combinations of run lengths and reduced color components in a scan line which are associated with reduced color components whose differences are less than a predetermined color difference threshold.

47. The camera of claim 37, wherein the digital word size of each of said digital color components is six bits.

48. The camera of claim 47, wherein said means for reducing said word size of each of said digital color components is adapted to reduce the word size of each of said digital color components to 4 bits.

49. The camera of claim 48, wherein said means for encoding said plurality of pixels in each scan line is adapted to encode each said combination of run length and reduced color components as at least a 16 bit digital word.

50. The camera of claim 37, wherein said means for determining said luminance function comprises means for summing each of said three digital color component signals.

51. The camera of claim 50, wherein said luminance function has a digital word size of 8 bits.

52. The camera of claim 50, wherein said means for determining said luminance function includes weighting of the sum of said three digital color component signals with respect to one of said three digital color component signals.

* * * * *